(12) United States Patent
Chen et al.

(10) Patent No.: US 11,821,447 B2
(45) Date of Patent: Nov. 21, 2023

(54) DOVETAIL-TYPE EMBEDDED CONNECTING PIECE AND OFFICE DESK

(71) Applicant: Anhui Agricultural University, Hefei (CN)

(72) Inventors: Yuxia Chen, Hefei (CN); Chuangye Li, Hefei (CN); Yong Guo, Hefei (CN); Bin Yan, Hefei (CN); Xinhui Fan, Hefei (CN)

( * ) Notice: Subject to any disclaimer, the term of this patent is extended or adjusted under 35 U.S.C. 154(b) by 110 days.

(21) Appl. No.: 17/525,756

(22) Filed: Nov. 12, 2021

(65) Prior Publication Data

US 2022/0163057 A1    May 26, 2022

(51) Int. Cl.
*F16B 12/44*    (2006.01)

(52) U.S. Cl.
CPC .................................... *F16B 12/44* (2013.01)

(58) Field of Classification Search
CPC ...... F16B 12/44; F16B 12/10; F16B 12/2063; F16B 12/125; F16B 5/008; F16B 5/0614; F16B 2005/0678; F16B 2012/106; A47B 3/06; A47B 13/088; A47B 13/003; A47B 13/021; A47B 47/0075; A47F 3/12; A47F 3/005
USPC ...... 312/265.5, 265.6, 257.1, 263, 195, 196, 312/223, 3, 223.3; 403/372, 381, 403; 108/158.12
See application file for complete search history.

(56) References Cited

U.S. PATENT DOCUMENTS

| 559,506 | A | * | 5/1896 | Swain | |
|---|---|---|---|---|---|
| 1,859,799 | A | * | 5/1932 | Rix | F16B 12/02 217/17 |
| 1,916,894 | A | * | 7/1933 | Rix | A47F 3/12 312/140 |
| 3,042,158 | A | * | 7/1962 | Michaels | F16B 12/50 403/403 |
| RE26,105 | E | * | 11/1966 | Guillion et al. | F16B 12/02 312/351.3 |
| 4,731,973 | A | * | 3/1988 | Stenemann | A47F 3/12 52/204.597 |
| 5,120,116 | A | * | 6/1992 | Amstutz | A47F 11/10 403/231 |

(Continued)

FOREIGN PATENT DOCUMENTS

| CN | 109780018 | * | 5/2019 |
|---|---|---|---|
| CN | 213929051 | * | 8/2021 |

(Continued)

OTHER PUBLICATIONS

CN213929051 English abstract (Year: 2021).*
CN214156615 English abstract (Year: 2021).*

(Continued)

*Primary Examiner* — Janet M Wilkens (57) ABSTRACT

A dovetail-type embedded connecting piece and an office desk are provided. The dovetail tenon type embedded connecting piece includes a dovetail groove and a dovetail tenon in a mortise-tenon connection with the dovetail groove. The dovetail groove includes a main plate and an auxiliary plate detachably connected with the main plate. A first clamping groove and the dovetail groove are formed by the main board and the auxiliary plate in use. The dovetail tenon includes a left side plate and a right side plate detachably connected to the left side plate, and in a use state, a second clamping groove is formed by the left side plate and the right side plate.

4 Claims, 7 Drawing Sheets

(56) References Cited

U.S. PATENT DOCUMENTS

| | | | | | |
|---|---|---|---|---|---|
| 5,435,254 | A | * | 7/1995 | Amey | A47B 13/083 |
| | | | | | 248/188.1 |
| 5,470,139 | A | * | 11/1995 | Hsiao | A47F 3/12 |
| | | | | | 312/138.1 |
| 6,682,256 | B1 | * | 1/2004 | Hor | F16B 12/02 |
| | | | | | 403/403 |
| 7,255,511 | B2 | * | 8/2007 | Dolan | F16B 12/125 |
| | | | | | 403/231 |
| 2009/0242555 | A1 | * | 10/2009 | Richter | G09F 7/18 |
| | | | | | 220/23.83 |

FOREIGN PATENT DOCUMENTS

| | | | |
|---|---|---|---|
| CN | 214156615 | * | 9/2021 |
| CN | 112360854 | * | 4/2022 |
| DE | 3017589 | * | 11/1980 |
| FR | 2333148 | * | 7/1977 |
| FR | 2628796 | * | 9/1989 |
| NL | 9101095 | * | 1/1993 |

OTHER PUBLICATIONS

CN 112360854 English abstract (Year: 2022).*
CN109780018 English abstract (Year: 2019).*

* cited by examiner

DOVETAIL-TYPE EMBEDDED CONNECTING PIECE AND OFFICE DESK

CROSS-REFERENCE TO RELATED APPLICATIONS

The application claims priority to Chinese patent application No. 202011355714.6, filed on Nov. 26, 2020, the entire contents of which are incorporated herein by reference.

TECHNICAL FIELD

The invention relates to the technical field of office desks, and more specifically, to a dovetail-type embedded connecting piece and an office desk.

BACKGROUND

At present, most of the commonly used connecting pieces in the market are connected by nails or connecting pieces, and the connecting method requires nailing, punching or grooving of plates, so that in the installation process, on the one hand, the processing cost is increased, and the aesthetics and integrity of the plates are affected; and on the other hand, the plates with larger hardness are difficult to use, so that human and material resources are increased.

The detachable connection has many advantages in the aspects of transportation, cost and the like. The connection used in the market at present has the advantages of pre-positioning, complex process and high installation difficulty. If the connection is not in place, the strength is low and the stability is poor, and the process cost of the plate is reduced.

SUMMARY

The technical problem to be solved by the disclosure is to provide a dovetail-type embedded connecting piece and an office desk, which have high connecting performance and strong dimensional stability, can be flexibly disassembled and assembled, do not damage the surface of a plate, and reduce the processing, transportation and packaging costs.

In order to solve the technical problem, the invention adopts the technical scheme that the dovetail-type embedded connecting piece includes a dovetail groove and a dovetail tenon in a mortise-tenon connection with the dovetail groove.

The dovetail groove includes a main board and an auxiliary board detachably connected with the main board. The main board and the auxiliary board form a first clamping groove and a dovetail groove in a use state.

The dovetail tenon includes a left side plate and a right side plate which is detachably connected with the left side plate. The left side plate and the right side plate form a second clamping groove in a use state.

Furthermore, the main board includes a first bottom plate and a first vertical plate vertically arranged on the first bottom plate. The auxiliary board includes a second bottom plate and a second vertical plate vertically arranged on the second bottom plate. The main board and the auxiliary board are fixedly connected through a fixing component. The first clamping groove is formed by the first bottom plate of the main plate and the second bottom plate of the auxiliary plate, and the dovetail groove is formed by the first vertical plate of the main plate and the second vertical plate of each auxiliary plate.

Furthermore, the left side plate and the right side plate are of the same structure and both include a tenon plate and a dovetail plate which is vertically connected with the tenon plate. The left side plate and the right side plate are fixedly connected through a connecting component, the second clamping groove is formed by two dovetail plates of the left and right side plates, and two dovetail plates are connected through the connecting component to form a tenon. The tenon is inserted into the dovetail groove in a sliding manner.

Furthermore, the dovetail groove and the dovetail tenon are reinforced and fixed by a reinforcing component. The reinforcing component includes a third threaded hole arranged at one side of the second vertical plate, a fourth threaded hole arranged on the tenon plate, a fifth threaded hole arranged on the first vertical plate and a third screw penetrating through the third threaded hole, the fourth threaded hole and the fifth threaded hole.

Furthermore, the fixing component includes a first threaded hole opened on the first bottom plate, a second threaded hole opened on one side of the second vertical plate, and a first screw matched with the first threaded hole and the second threaded hole. The first screw passes through the first threaded hole and the second threaded hole to fixedly connect the first bottom plate and the second vertical plate.

Furthermore, the connecting component includes a first screw hole arranged on the tenon plate, a second screw hole arranged on the tenon plate, a nut penetrating through the first screw hole and the second screw hole, and a second screw matched with the nut. The second screw is matched with the nut to fix the left side plate and the right side plate.

Furthermore, a first buffer gasket is arranged at the connecting position of the two tenon plates. The first buffer gasket is respectively provided with a first hole corresponding to the fixing component and the reinforcing component.

Furthermore, a second buffer gasket is arranged at the connecting position of the second vertical plate and the first bottom plate, and a second hole corresponding to the connecting assembly is formed in the second buffer gasket.

The office desk is formed by connecting a number of mounting plates through the dovetail-type embedded connecting piece.

Advantages of the Disclosure are:

The dovetail groove and the dovetail tenon of the dovetail-type embedded connecting piece are in mortise-tenon connection. The mounting is simple, the first clamping groove is formed on the dovetail groove, the second clamping groove is formed on the dovetail tenon, both the first clamping groove and the second clamping groove are used for clamping a plate to achieve a connection effect. Nailing, punching or grooving of the plate is not needed in the process, which solves the problems of large processing difficulty, high cost and the like for hard plates, greatly reduces the packaging cost and the transportation cost by respectively packaging the mounting plate and the connecting piece, can be repeatedly mounted, has strong practicability. The raw materials of the connecting piece can be materials with higher strength such as ABS, PA nylon, aluminum alloy, titanium alloy, magnesium alloy, zinc alloy, photosensitive resin, nylon for SLS and the like. The connecting pieces of different materials can be selected according to different plate veneers, so that the veneers are prevented from being damaged, and the selection space of a user is expanded.

Wherein in the drawings: 1, dovetail groove; 101, mainboard; 1011, first bottom plate; 1012, first vertical plate; 102, auxiliary board; 1021, second bottom plate; 1022, second vertical plate; 2, dovetail tenon; 201, left side plate; 2011, tenon head plate; 2012, tenon tail plate; 1, tenon head; 202, right side plate; 3, fixing components; 301, a first threaded hole; 302, a second threaded hole; 303, a first screw; 4, connecting components; 401, a first screw hole; 402, a second screw hole; 403, nut; 404, a second screw; 5, reinforcement components; 501, a third threaded hole; 502, a fourth threaded hole; 503, a fifth threaded hole; 504, third screw; 6, first buffer gasket; 601, a first hole; 7, second buffer gasket; 701, a second hole; 8, mounting plate; A, a first clamping groove; B, a dovetail groove; C, a second clamping groove.

DETAILED DESCRIPTION OF THE EMBODIMENTS

The following is a clear and complete description of the technical solutions in the embodiments of the disclosure in combination with the accompanying drawings. Obviously, the embodiments provided are only a part of the embodiments, but not all of them. The embodiments and features of the embodiments in the disclosure may be combined with each other without conflicts. Based on the embodiments of the disclosure, all other embodiments obtained by a person of ordinary skill in the art without creative efforts fall within the scope of protection of the disclosure.

It should be noted that if directional indications (such as up, down, left, right, front, back) are involved in the embodiment of the disclosure, the directional indications are only used to explain the relative position and movement of the components in a specific posture (as shown in the figures). If the specific posture changes, the directional indication will change accordingly.

In addition, if "first", "second", etc. are referred to in an embodiment of the disclosure, they are used for descriptive purposes only and should not be construed to indicate or imply relative importance or to implicitly indicate the number of technical features indicated. As a result, features defined as "first" or "second" may expressly or implicitly include at least one of the features. In addition, the meaning of "and/or" appearing in the whole text includes three parallel schemes. Taking "a and/or B" as an example, which includes the scheme of A, or the scheme of B, or the scheme that A and B are satisfied at the same time. In addition, "a plurality" means more than two. In addition, The technical solutions of the various embodiments may be combined with each other, but they must be based on the fact that a person of ordinary skill in the art can realize them. When the combination of technical solutions is contradictory or cannot be realized, it shall be deemed that such combination of technical solutions does not exist and is not within the scope of protection of the disclosure.

Referring to FIGS. 1-7.

Figure 1:
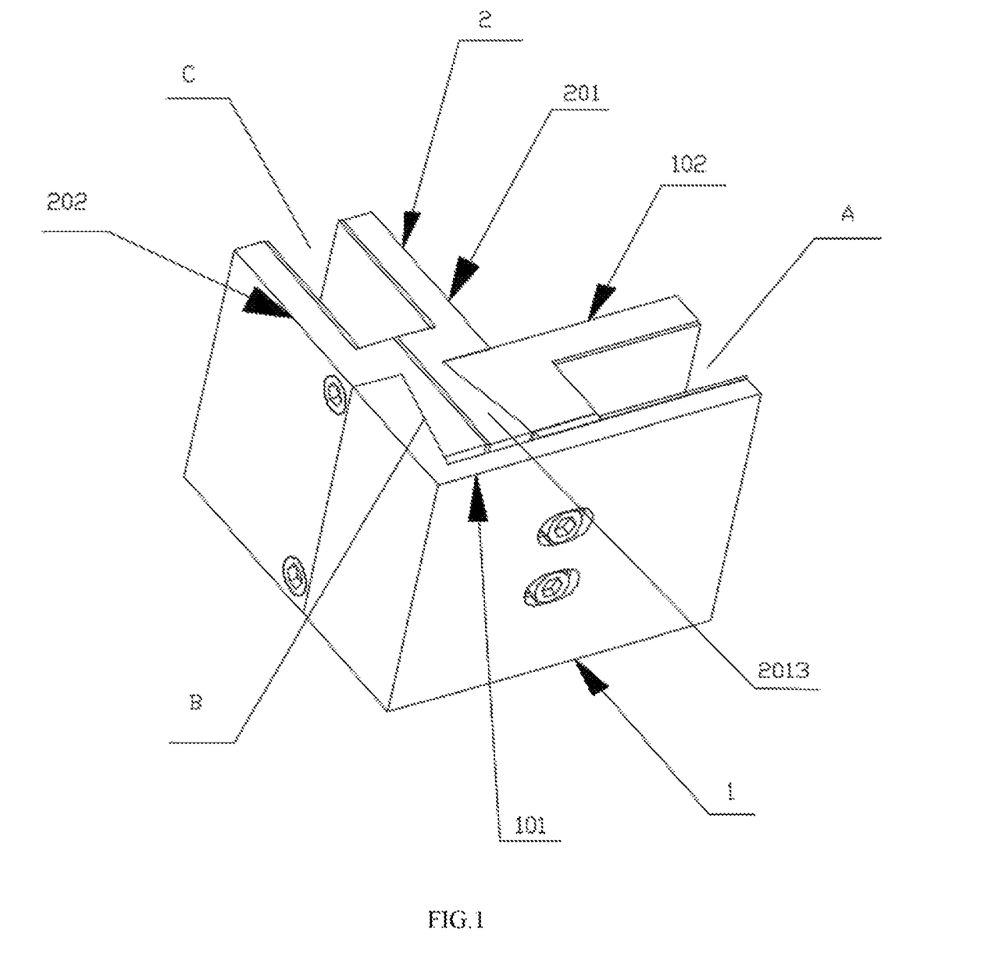
FIG. 1 is a structural diagram of a dovetail type embedded connecting piece of the disclosure.

A dovetail-type embedded connecting piece is provided in the disclosure, which includes a dovetail groove 1 and a dovetail tenon 2 in mortise and tenon connection with the dovetail groove 1.

Figure 2:
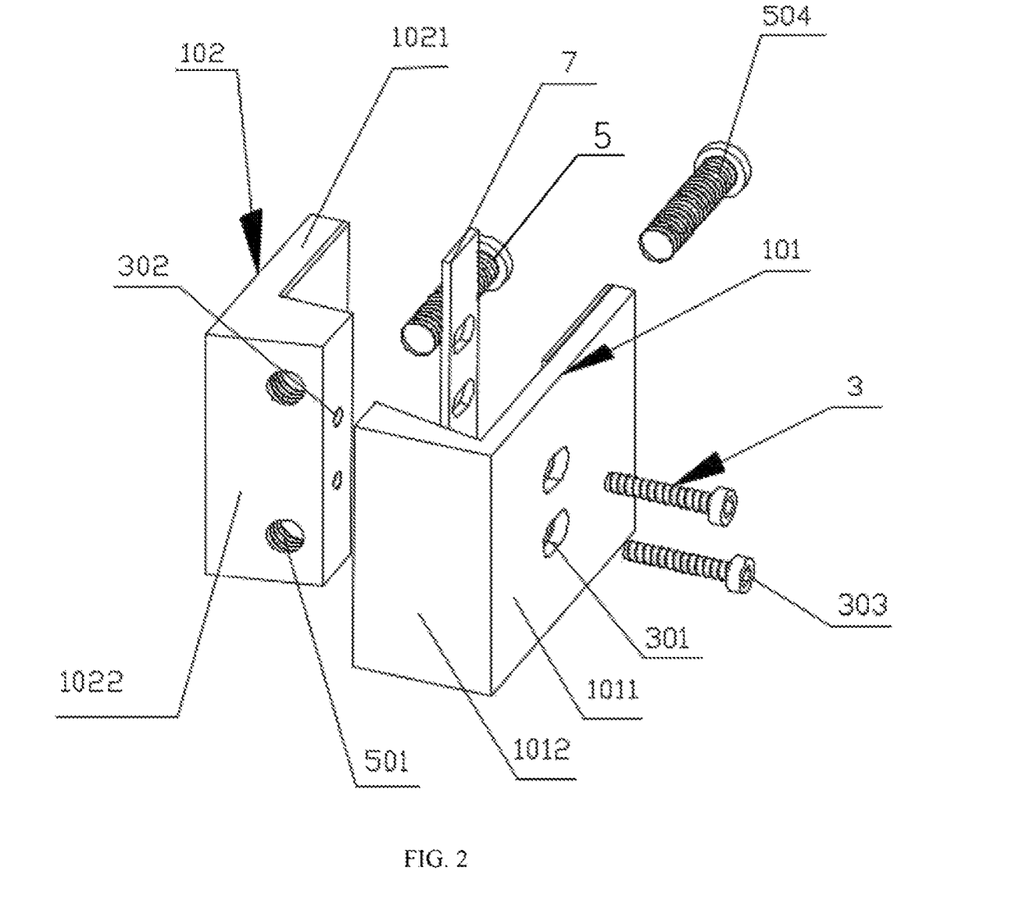
FIG. 2 is a schematic view of the internal structure of the dovetail groove of the disclosure.

The dovetail groove 1 includes a main plate 101 and an auxiliary plate 102 detachably connected to the main plate 101. In use, the main plate 101 and the auxiliary plate 102 form a first clamping groove A and a dovetail groove B.

Figure 3:
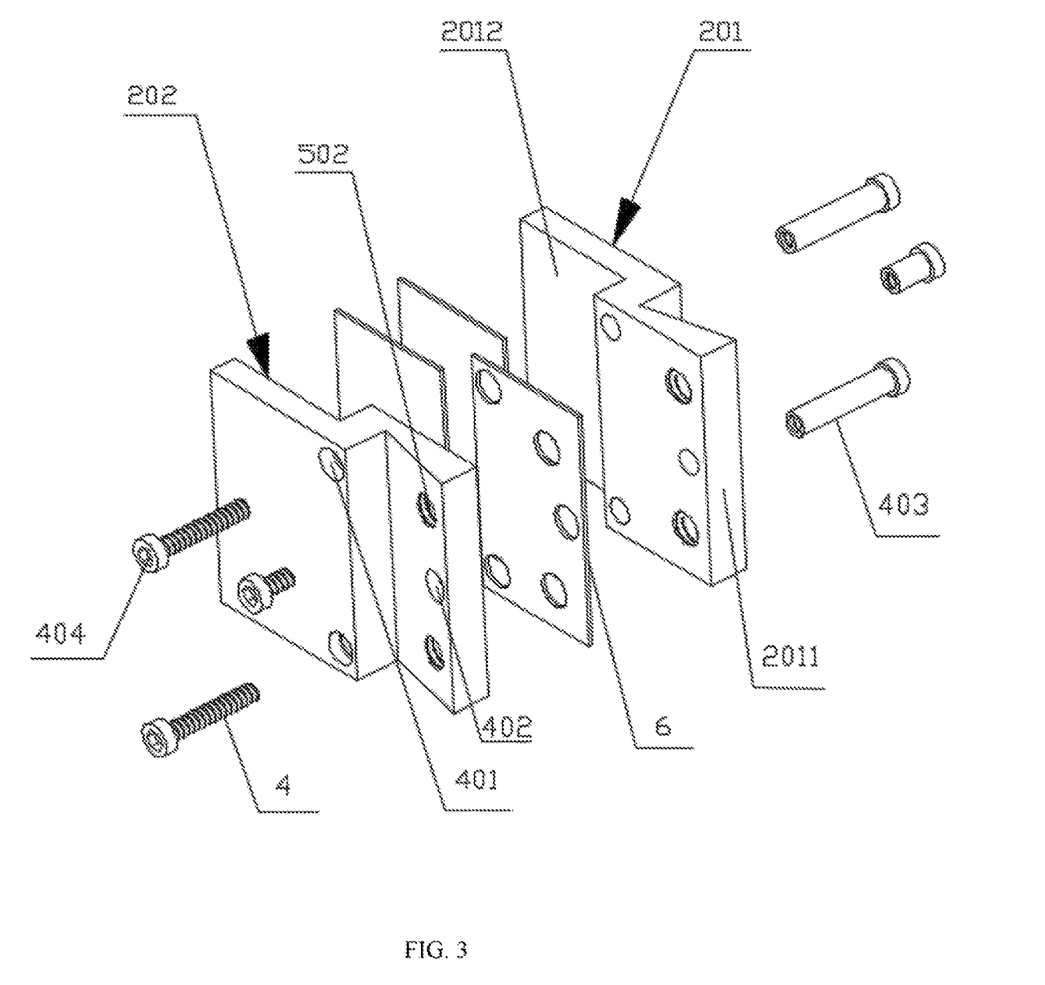
FIG. 3 is a schematic view of the internal structure of the dovetail tenon of the disclosure.

The dovetail tenon 2 includes a left side plate 201 and a right side plate 202 detachably connected to the left side plate 201. In use, the second clamping groove C is formed by the left side plate 201 and the right side plate 202.

Figure 6:
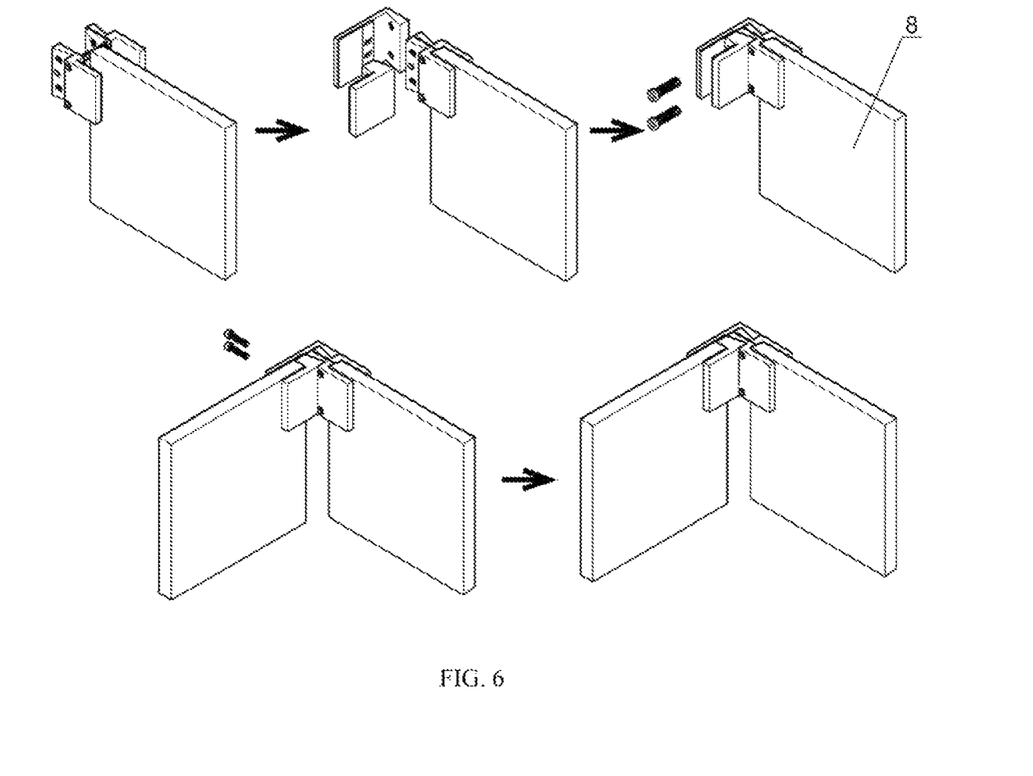
FIG. 6 is a schematic diagram of the installation steps for connecting two plates according to the disclosure.

When two mounting plates are mounted, the mounting plates only need to be mounted in the first clamping groove and the second clamping groove of the dovetail type embedded connecting piece respectively. When three T-shaped mounting plates are mounted, three dovetail type embedded connecting pieces need to be mounted on the same edge of the same mounting plate. Wherein the clamping grooves at the other ends of the dovetail type embedded connecting pieces at the two ends are opposite to the clamping grooves at the other ends of the dovetail type embedded connecting pieces in the middle, and the two clamping grooves clamp the mounting plate.

The dovetail groove and the dovetail tenon of the dovetail-type embedded connected piece are in mortise and tenon connection. The mounting manner is simple. The first clamping groove is formed on the dovetail groove, and the second clamping groove is formed on the dovetail tenon. Both the first clamping groove and the second clamping groove are used for clamping a plate to achieve a connection effect. Nailing, punching or grooving of the plate is not needed in the process, which solves the problems of large processing difficulty, high cost and the like for hard plates, greatly reduces the packaging cost and the transportation cost by respectively packaging the mounting plate and the connecting piece, can be repeatedly mounted, and has strong practicability. The raw materials of the connecting piece can be materials with higher strength such as ABS, PA nylon, aluminum alloy, titanium alloy, magnesium alloy, zinc alloy, photosensitive resin, nylon for SLS and the like. Connecting pieces of different materials can be selected according to different plate veneers, so that the veneers are prevented from being damaged, and the selection space of a user is expanded.

Figure 4:
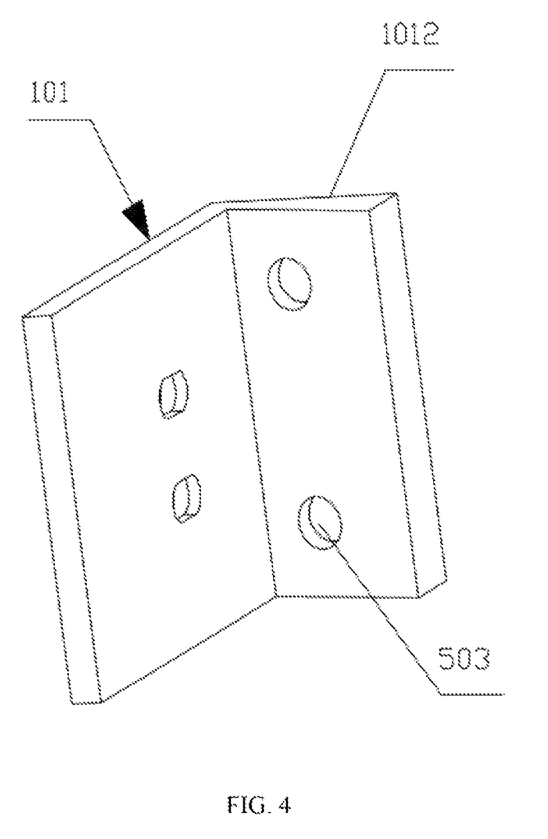
FIG. 4 is a schematic diagram of the structure of the mainboard of the disclosure.

In one embodiment, the main board 101 includes a first bottom board 1011 and a first vertical board 1012 vertically provided on the first bottom board 1011. The auxiliary board 102 includes a second bottom board 1021 and a second vertical board 1022 vertically provided on the second bottom board 1021. The main board 101 and the auxiliary board 102 are fixedly connected through a fixing component 3. The first clamping groove A is formed by the first bottom plate 1011 of the main plate 101 and the second bottom plate 1021 of the auxiliary plate 102, and the dovetail groove B is formed by the first vertical plate 1012 of the main plate 101 and the second vertical plate 1022 of the auxiliary plate 102. In the design, the first vertical plate and the second vertical plate are arranged at intervals to form the dovetail groove. The first bottom plate and the second bottom plate are arranged at intervals to form a first clamping groove.

In another embodiment, the left side plate 201 and the right side plate 202 are of the same structure, and both of which include a tenon head plate 2011 and a tenon tail plate 2012 vertically connected to the tenon head plate 2011. The left side plate 201 and the right side plate 202 are fixedly connected by a connecting assembly 4. The second clamping groove C is formed by two dovetail plates 2012 of the left side plate 201 and the right side plate 202. The two tenon head plates 2011 are connected by the connecting assembly 4 to form a tenon 2013. The tenon 2013 is slidably inserted into the dovetail groove B. The cross section of the tenon plate is L-shaped. The dovetail plate is vertically fixed on the tenon plate, so that the two dovetail plates are arranged at intervals to form a second clamping groove. The tenons and the dovetail grooves is in mortise-tenon connection to enhance the stability, and the installation is simple and easy to realize.

In one embodiment, the dovetail groove 1 and the dovetail tenon 2 are further reinforced and fixed by a reinforcing component 5. The reinforcing component 5 includes a third threaded hole 501 formed in one side of the second vertical plate 1022, a fourth threaded hole 502 formed in the tenon plate 2011, a fifth threaded hole 503 formed in the first vertical plate 1012, and a fourth threaded hole 502 formed in one side of the third threaded hole 501 and the third screw 504 in the fourth threaded hole 502 and the fifth threaded hole 503. The dovetail tenon and the dovetail groove are prevented from sliding up and down with this design, and are further fixed.

In an embodiment, the fixing assembly 3 includes a first threaded hole 301 formed in the first bottom plate 1011, a second threaded hole 302 formed in one side of the second vertical plate 1022, and a first screw 303 matched with the first threaded hole 301 and the second threaded hole 302. The first screw 303 passes through the first threaded hole 301 and the second threaded hole 302 to fixedly connect the first bottom plate 1011 and the second vertical plate 1022. The first bottom plate and the second vertical plate are connected more tightly through the connection of the first screw with this design, and the stability is enhanced.

In one embodiment, the connecting assembly 4 includes a first screw hole 401 formed in the tenon plate 2012, a second screw hole 402 formed in the tenon plate 2011, a nut 403 passing through the first screw hole 401 and the second screw hole 402, and a second screw 404 cooperating with the nut 403. The second screw 404 cooperates with the nut 403 to fix the left side plate 201 and the right side plate 202. The left side plate and the right side plate are connected more tightly through the connection of the second screw with this design, and the stability is enhanced.

Figure 5:
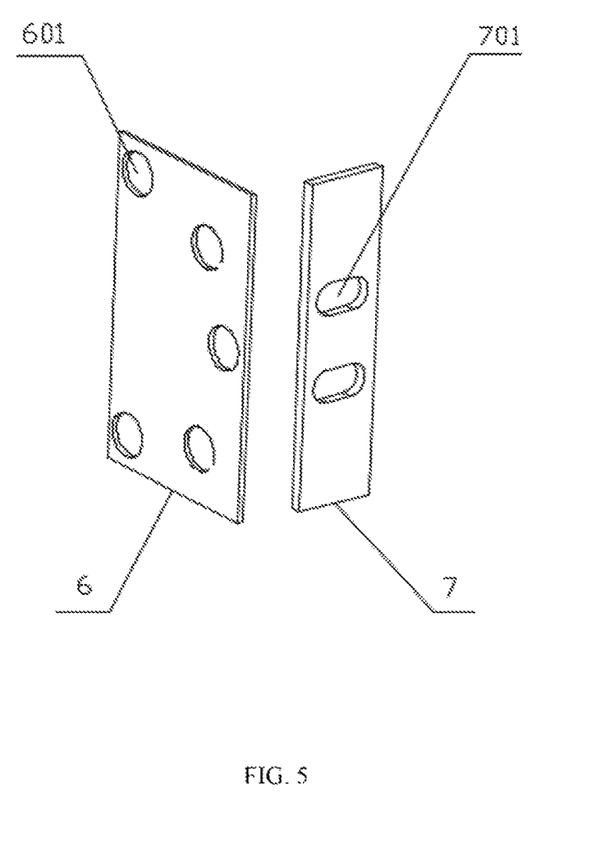
FIG. 5 is a schematic view of the cushion pad of the disclosure.

In one embodiment, a first buffer gasket 6 is provided at a position where the two tenon plates 2011 are connected. The first buffer gasket 6 is provided with a first hole 601 corresponding to the fixing component 3 and the reinforcing component 5, respectively. The friction between the connecting piece plates is reduced, the balance is kept, and the service life of the connecting piece is prolonged with this design.

In one embodiment, a second cushion pad 7 is disposed at a position where the second vertical plate 1022 is connected to the first bottom plate 1011. The second cushion pad 7 is provided with a second hole 701 corresponding to the connecting component 4. The friction between the connecting piece plates is reduced, the balance is kept, and the service life of the connecting piece is prolonged with this design.

Figure 7:
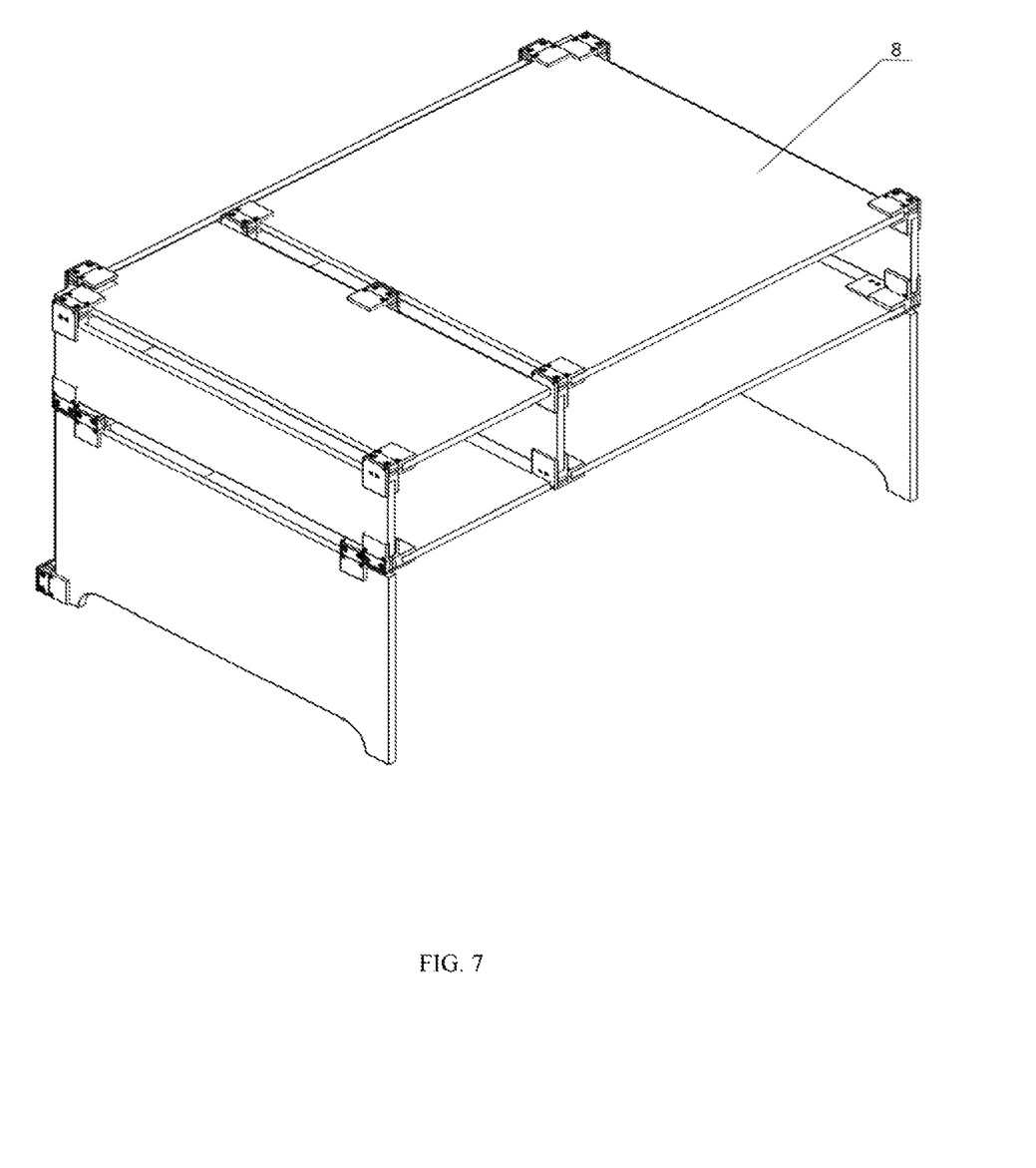
FIG. 7 is a schematic diagram of the structure of the office desk of the disclosure.

Based on the dovetail connecting pieces, an office desk is also provided in the disclosure as shown in FIG. 7, which includes a number of mounting plates 8 connected by the dovetail connecting pieces in mortise-tenon connection. The desk can be detachably mounted, the occupied space is smaller during transportation, the transportation is convenient, and the transportation cost is reduced with this design.

It should be understood that the examples and embodiments described herein are illustrative only and are not intended to limit the disclosure, and that those skilled in the art can make various modifications or changes therefrom. Any modifications, equivalents, improvements, etc. embodying the spirit and principles of the disclosure are intended to be included within the scope of protection of the disclosure.

What is claimed is:

1. A dovetail-type embedded connecting piece comprising: a dovetail body and a dovetail tenon in a mortise-tenon connection with the dovetail body; the dovetail body comprises a main plate and an auxiliary plate detachably connected with the main plate; a first clamping groove and a dovetail groove are defined by the main plate and the auxiliary plate in use; the dovetail tenon comprises a left side plate and a right side plate detachably connected to the left side plate, and in a use state, a second clamping groove is formed by the left side plate and the right side plate; the main plate comprises a first bottom plate and a first vertical plate vertically arranged on the first bottom plate; the auxiliary plate comprises a second bottom plate and a second vertical plate vertically arranged on the second bottom plate; the main plate and the auxiliary plate are fixedly connected through a fixing assembly; the first clamping groove is formed by the first bottom plate of the main plate and the second bottom plate of the auxiliary plate; the dovetail groove is formed by the first vertical plate of the main plate and the second vertical plate of the auxiliary plate;

the left side plate and the right side plate are of a same structure, and both comprise a tenon head plate and a tenon tail plate vertically connected to the tenon head plate; the left side plate and the right side plate are fixedly connected through a connecting assembly; the second clamping groove is formed by two tenon tail plates of the left side plate and the right side plate; two tenon head plates are connected by the connecting assembly to form a tenon, and the tenon is slidably inserted in the dovetail groove; side wall of the tenon tail plates are flat, a mounting plate can be hold firmly between the left side plate and the right side plate by the connecting assembly;

the dovetail body and the dovetail tenon are reinforced and fixed by a reinforcing component; the reinforcing component comprises a third threaded hole formed in one side of the second vertical plate, a fourth threaded hole formed in the tenon plate, a fifth threaded hole formed in the first vertical plate, and a fourth threaded hole formed in one side of the second vertical plate and a third screw in the fourth threaded hole and the fifth threaded hole, the connecting assembly comprises a first screw hole provided on the tenon plate, a second screw hole provided on the tenon plate, a nut passing through the first screw hole and the second screw hole, and a second screw cooperating with the nut; the second screw cooperates with the nut to secure the left side plate and the right side plate;

the fixing assembly comprises a first threaded hole opened on the first bottom plate, a second threaded hole opened on one side of the second vertical plate, and a first screw matched with the first threaded hole and the second threaded hole; the first screw passes through the first threaded hole; and the second threaded hole to fixedly connect the first bottom plate and the second vertical plate.

2. The dovetail-type embedded connecting piece of claim 1, wherein a first buffer gasket is arranged at the connecting position of the two tenon plates; and the first buffer gasket is provided with a first hole corresponding to the fixing assembly and the reinforcing component respectively.

3. The dovetail-type embedded connecting piece of claim 1, wherein a second buffer gasket is provided at a connection position between the second vertical plate and the first bottom plate; and the second buffer gasket is provided with a second hole corresponding to the connecting assembly.

4. An office desk formed by connecting a plurality of mounting plates by using multiple of the dovetail type embedded connecting pieces according to claim 1.

* * * * *